United States Patent [19]
Carrender et al.

[11] Patent Number: 6,061,614
[45] Date of Patent: May 9, 2000

[54] ELECTRONIC TAG INCLUDING RF MODEM FOR MONITORING MOTOR VEHICLE PERFORMANCE

[75] Inventors: Curtis L. Carrender, Placitas; John Henry Linn; James Lujan, both of Albuquerque; Frank Kenneth Wunderlin, Placitas, all of N.Mex.

[73] Assignee: Amtech Systems Corporation, Dallas, Tex.

[21] Appl. No.: 08/954,339

[22] Filed: Oct. 17, 1997

[51] Int. Cl.[7] .............................. G01S 13/00; G06F 15/00
[52] U.S. Cl. .......................... 701/33; 701/35; 701/24; 342/51; 342/58; 342/61; 340/825.54
[58] Field of Search ................................. 701/33, 35, 24; 342/42, 51, 58, 61, 70, 71, 72, 73; 340/825.54, 505, 568, 572

[56] References Cited

U.S. PATENT DOCUMENTS

| | | | |
|---|---|---|---|
| 4,688,026 | 8/1987 | Scribner et al. | 340/572 |
| 4,728,922 | 3/1988 | Christen et al. | 340/52 |
| 4,739,328 | 4/1988 | Koelle et al. | 342/44 |
| 4,797,948 | 1/1989 | Milliorn et al. | 455/54 |
| 4,804,937 | 2/1989 | Barbiaux et al. | 340/52 |
| 4,897,642 | 1/1990 | DiLullo et al. | 340/825 |
| 4,926,331 | 5/1990 | Windle et al. | 364/424 |
| 4,939,652 | 7/1990 | Steiner | 364/424 |
| 5,025,253 | 6/1991 | DiLullo et al. | 340/825 |
| 5,030,807 | 7/1991 | Landt et al. | 235/375 |
| 5,055,459 | 10/1991 | Anderson et al. | 514/114 |
| 5,055,659 | 10/1991 | Hendrick et al. | 235/439 |
| 5,058,044 | 10/1991 | Stewart et al. | 364/551 |
| 5,113,344 | 5/1992 | Kellogg et al. | 364/424 |
| 5,250,761 | 10/1993 | Koyanagi | 177/141 |
| 5,257,190 | 10/1993 | Crane | 364/424 |
| 5,289,378 | 2/1994 | Miller et al. | 364/424 |
| 5,442,553 | 8/1995 | Parrillo | 364/424 |
| 5,445,347 | 8/1995 | Ng | 246/169 |

(List continued on next page.)

FOREIGN PATENT DOCUMENTS

| | | |
|---|---|---|
| 0 644 515 A1 | 3/1995 | European Pat. Off. . |
| 0 754 940 A2 | 1/1997 | European Pat. Off. . |
| 43 34 859 A1 | 12/1994 | Germany . |
| 2 263 376 | 7/1993 | United Kingdom . |

OTHER PUBLICATIONS

Bishel, "Maximizing Utilization of the SAE J1708 Serial Data Communication Link," Proceedings of the International Congress on Transportation Electronics, XP002091059, Oct. 20–22, 1986, pp. 287–299.

Hughes, "Vehicle to radside communications (VRC) Linking Solutions to Problems", Transportation Management Systems, product information, 5 pgs., date unknown.

Schoenian, "CVO Vehicle–to–Roadside Communications Applications," SAE International, SAE Technical paper 952681, 8 pgs., Nov. 1995.

(List continued on next page.)

*Primary Examiner*—William A. Cuchlinski, Jr.
*Assistant Examiner*—Yonel Beaulieu
*Attorney, Agent, or Firm*—Fish & Richardson P.C.

[57] ABSTRACT

A method and apparatus for communicating between a host and a motor vehicle, the motor vehicle including an on board computer system having a bus for communicating with a plurality of motor vehicle systems. The apparatus includes an electronic tag having a transceiver for transmitting data to and receiving data from the host, a memory for storing bus requests and bus response data, a decoder for decoding requests from the host, a bus interface for reading data from and writing data to the bus and a conroller. The bus interface for extracting responses from the bus responsive to requests from the host. The responses may be stored in the memory. The controller is responsive to write requests from the host to transfer data to the bus interface and responsive to read requests from the host to transfer data stored in memory back to the host.

18 Claims, 4 Drawing Sheets

U.S. PATENT DOCUMENTS

| | | | |
|---|---|---|---|
| 5,450,321 | 9/1995 | Crane | 364/424 |
| 5,485,520 | 1/1996 | Craum et al. | 380/24 |
| 5,515,053 | 5/1996 | Hecht et al. | 342/42 |
| 5,552,789 | 9/1996 | Schuermann | 342/42 |
| 5,573,610 | 11/1996 | Koch et al. | 152/152.1 |
| 5,573,611 | 11/1996 | Koch et al. | 152/152.1 |
| 5,659,985 | 8/1997 | Stump | 37/348 |
| 5,666,101 | 9/1997 | Cazzani et al. | 340/323 |
| 5,666,528 | 9/1997 | Thai | 395/613 |
| 5,737,710 | 4/1998 | Anthonyson | 701/1 |
| 5,850,187 | 12/1998 | Carrender et al. | 340/825.54 |

OTHER PUBLICATIONS

"Serial Data Communications Between Microcomputer Systems in Heavy Duty Vehicle Applications," SAE International, J1708, 20 pgs., May 10, 1990.

"Joint SAE/TMC Electronic Data Interchange Between Microcomputer Systems in Heavy–Duty Vehicle Applications," SAE International, J1587, 137 pgs., Mar. 1996.

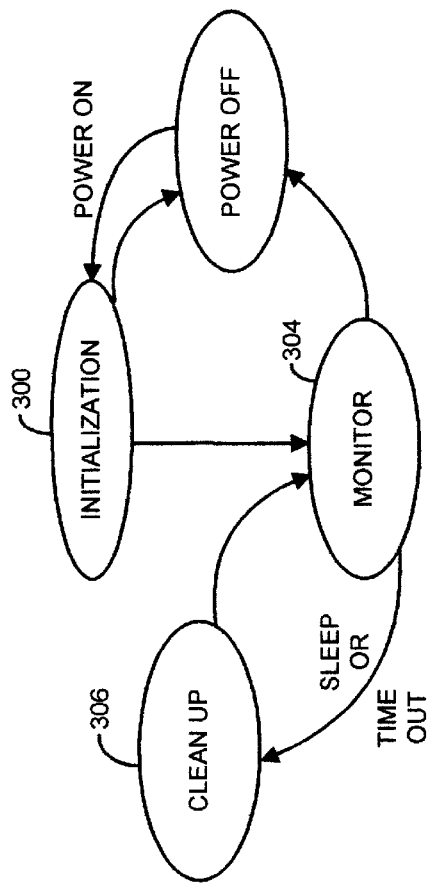
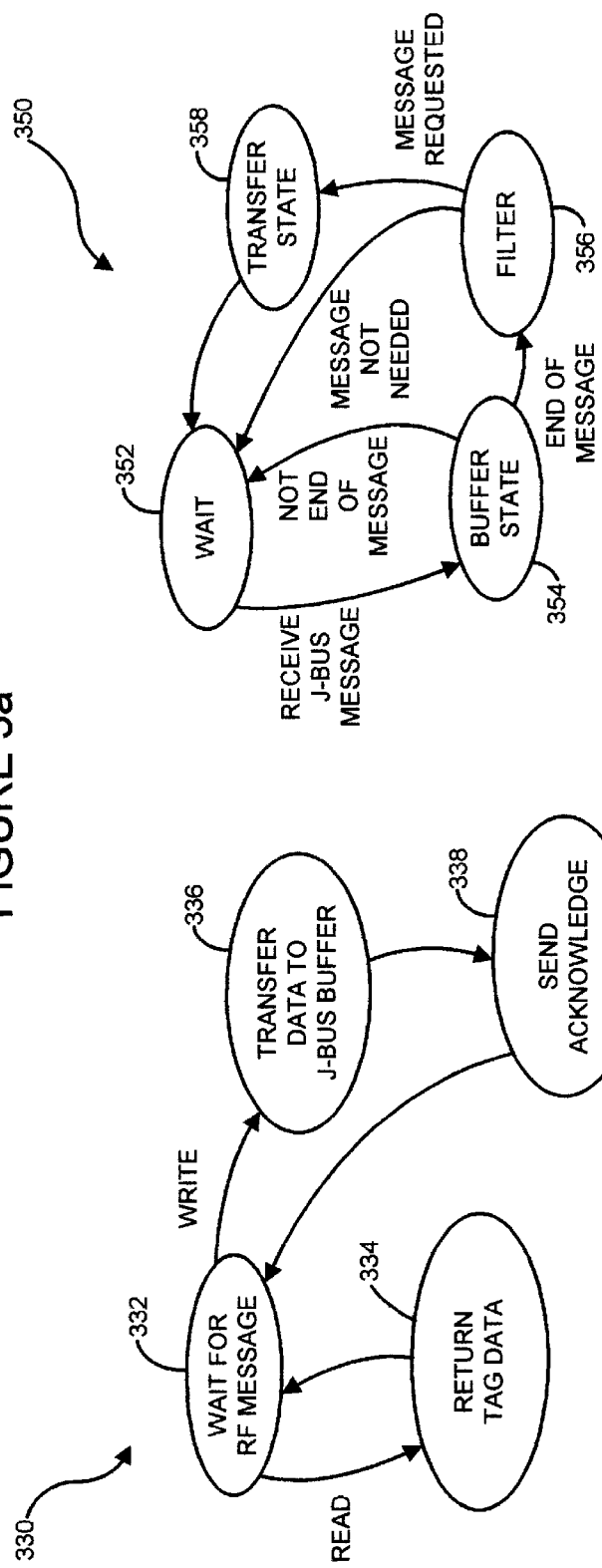
FIGURE 3a
FIGURE 3b
FIGURE 3c

ELECTRONIC TAG INCLUDING RF MODEM FOR MONITORING MOTOR VEHICLE PERFORMANCE

SUMMARY OF THE INVENTION

This invention relates generally to object identification systems, and more particularly to a method and apparatus for monitoring motor vehicle performance by a remote host.

BACKGROUND

Present day motor vehicles include numerous complex mechanical and electrical systems. Computers are used onboard to monitor the performance of such systems and assist in the efficient operation of the motor vehicle. During preventative maintenance or repair, an external diagnostic system can be directly coupled to the on-board computer thereby allowing for an efficient method of identifying motor vehicle performance problems and verifying corrective measures are effective in resolving such problems.

An example of the use of a computer system to monitor motor vehicle performance is found in the diesel trucking industry. For example, some diesel trucks manufactured by Cummings, Inc., of Columbus, Ind., include an on-board computer system which communicates with system and subsystem components of the diesel truck by means of a serial communication bus structure, referred to as the J1708 bus (hereinafter the "J-bus"). The protocol for communication on the J-bus has been standardized by the Truck and Bus Data Format Subcommittee of the Truck and Bus Electrical and Electronics Committee and by the S.1 Electrical & Electronics Study Group of the Maintenance Council in "Joint SAE/TMC Electronic Data Interchange Between Microcomputer Systems in Heavy-Duty Vehicle Applications" issued January 1988 and revised March 1996. Electrical and mechanical systems on the diesel truck are fitted with transmitters which are in turn coupled to the J-bus. Each transmitter may dump data onto the bus or respond to requests for information generated by the on-board computer system. During truck maintenance activities, a ground station can be coupled to the on-board computer system to monitor motor vehicle performance parameters. However, this requires the motor vehicle or diesel truck to return to a maintenance station or other ground facility that includes the ground station hardware.

In the diesel truck industry, efficient motor vehicle (truck) performance is of paramount concern. Substantial costs are incurred when trucks are out of service due to system failure or when the trucks are operated at less than optimum performance levels. Accordingly, regular maintenance of each truck is required to minimize down time and running costs. However, the regular maintenance provided to the vehicles is itself quite costly. The trucks typically have to be brought into a central maintenance facility and directly coupled to diagnostic systems. In general the maintenance schedules are based on truck mileage, and do not take into account any other performance criteria for a given individual truck. No easy method of screening individual trucks based on performance data is available.

BRIEF DESCRIPTION OF THE INVENTION

The present invention is directed to a method and apparatus for communicating between a host and a motor vehicle, the motor vehicle including an on board computer system having a bus for communicating with a plurality of motor vehicle systems. The apparatus includes an electronic tag having a transceiver for transmitting data to and receiving data from the host, a memory for storing bus requests and bus response data, a decoder for decoding requests from the host, a bus interface for reading data from and writing data to the bus and a controller. The bus interface for extracting responses from the bus responsive to requests from the host. The responses may be stored in the memory. The controller is responsive to write requests from the host to transfer data to the bus interface and responsive to read requests from the host to transfer data stored in memory back to the host.

Aspects of the invention include the following features. The tag may include a filter for filtering responses received from the bus and enabling the storage in memory only of a predetermined subset of the responses. The filter may monitor bus requests and store in memory only responses corresponding to bus requests transmitted from the host. The tag may include a filter database stored in the memory. The filter database may include one or more screening parameters for screening responses received from the bus. A screening parameter may include motor vehicle system identification information. A screening parameter may include an enable portion and a data portion. The controller may filter responses received by comparing the data portion of an enabled screening parameter with a portion of a received response to determine whether to store the received response in memory. The controller may enable storage of responses from the bus upon writing data to the bus.

The tag may include an antenna for receiving host requests and transmitting data back to the host, an encoder for encoding data to be transmitted to the host and a backscatter modulator for receiving an interrogating signal from a host reader including encoded requests and modulating the interrogating signal with encoded data received from the encoder.

The bus may be a J1708 bus. The motor vehicle may be a truck. The bus interface may include an RS-485 transceiver. The memory may include a receive buffer and a transmit buffer. The receive buffer may temporarily store responses from the bus prior to transfer to memory. The transmit buffer may buffer bus requests prior to transfer to the bus.

In another aspect, the invention provides an apparatus for remotely monitoring by a host the performance of a motor vehicle. The motor vehicle includes an on board computer system having a bus for communicating with a plurality of motor vehicle systems. The apparatus may include an electronic tag including a transceiver for transmitting data to and receiving data from the host, a memory for storing bus requests and bus response data and a decoder for decoding requests from the host. The requests may include a request command and request data. The request command may indicate one of a read and write operation. The request data may include one of location data in memory associated with the request command and a bus request.

The apparatus includes a bus interface for reading data from and writing data to the bus. The bus interface extracts responses from the bus responsive to requests from the host. The responses may be stored in the memory. A controller is included to respond to write requests to the bus by transferring a bus request to the bus interface and respond to read requests from the host by transferring data indicated by the location data back to the host.

In another aspect the invention provides a system for remotely monitoring motor vehicle performance including a system bus resident on the motor vehicle for communicating with a plurality of motor vehicle systems, a remote reader for generating host requests for extracting data from one or more motor vehicle systems and an electronic tag coupled to the system bus. The electronic tag includes a transceiver for transmitting data to and receiving data from the remote reader, a memory for storing bus requests and bus response data, a decoder for decoding requests from the remote reader and a bus interface for reading data from and writing data to the system bus. The bus interface may extract responses from the system bus responsive to requests from the remote reader. The responses may be stored in the memory. A controller is included to write requests from the remote reader to transfer data to the bus interface and respond to read requests from the remote reader to transfer data stored in memory back to the remote reader.

In another aspect, the invention provides a system for remotely monitoring motor vehicle performance including a system bus resident on the motor vehicle for communicating with a plurality of motor vehicle systems, a remote reader for generating host requests for extracting data from one or more motor vehicle systems and an electronic tag coupled to the system bus. The electronic tag includes a memory for storing bus requests and bus response data, a bus interface for reading data from and writing data to the system bus and a controller responsive to write requests from the remote reader to transfer data to the bus interface and responsive to read requests from the remote reader to transfer data stored in memory back to the remote reader.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 3a is a schematic state diagram for the electronic tag according to the present invention.

FIG. 3b is a schematic state diagram for an RF state machine according to the present invention.

FIG. 3c is a schematic state diagram of a J-bus monitor state machine according to the present invention.

DETAILED DESCRIPTION OF THE PREFERRED EMBODIMENTS

Figure 1:
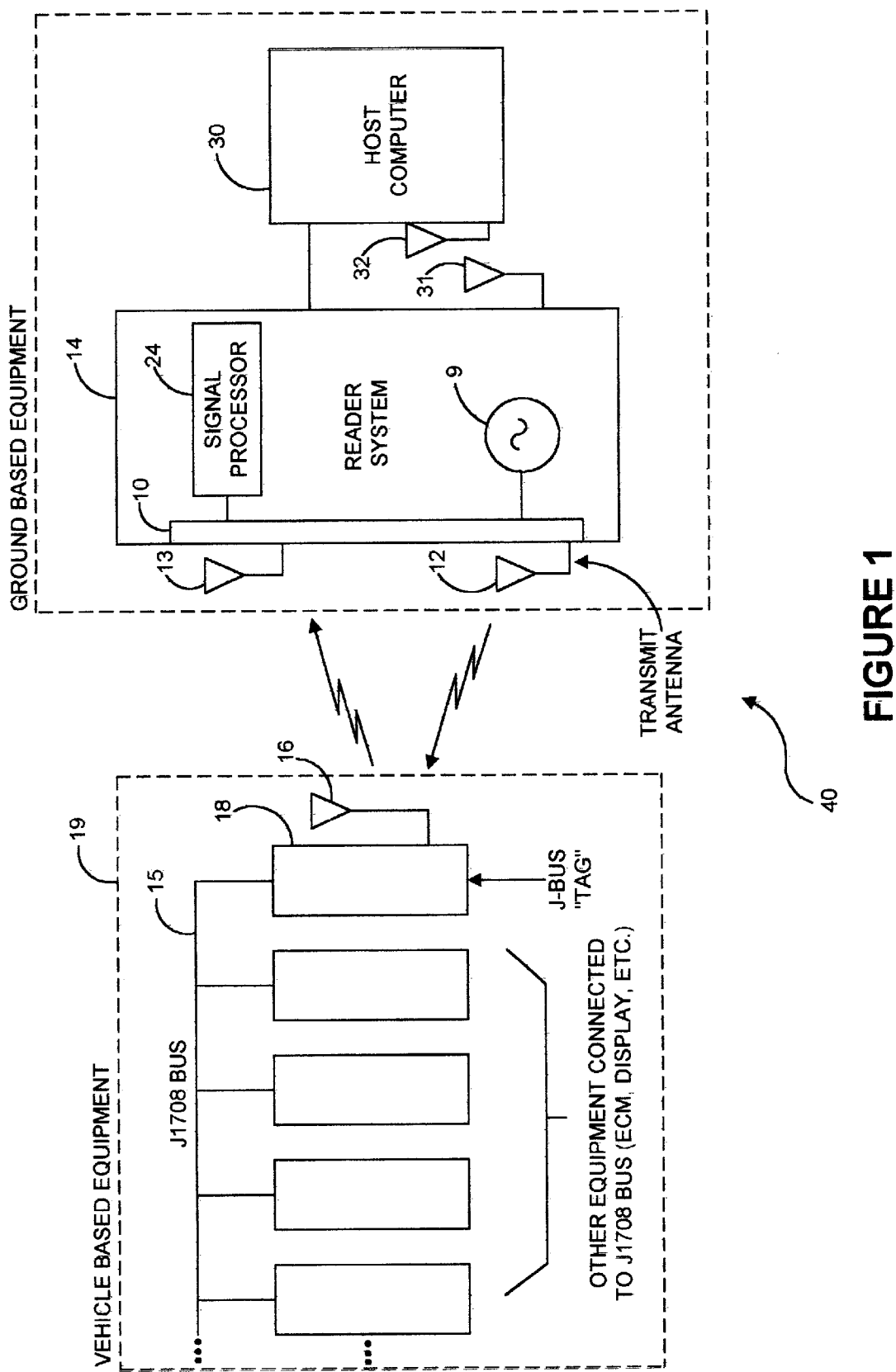
FIG. 1 is an electronic tag reader system according to the present invention.
Figure 2:
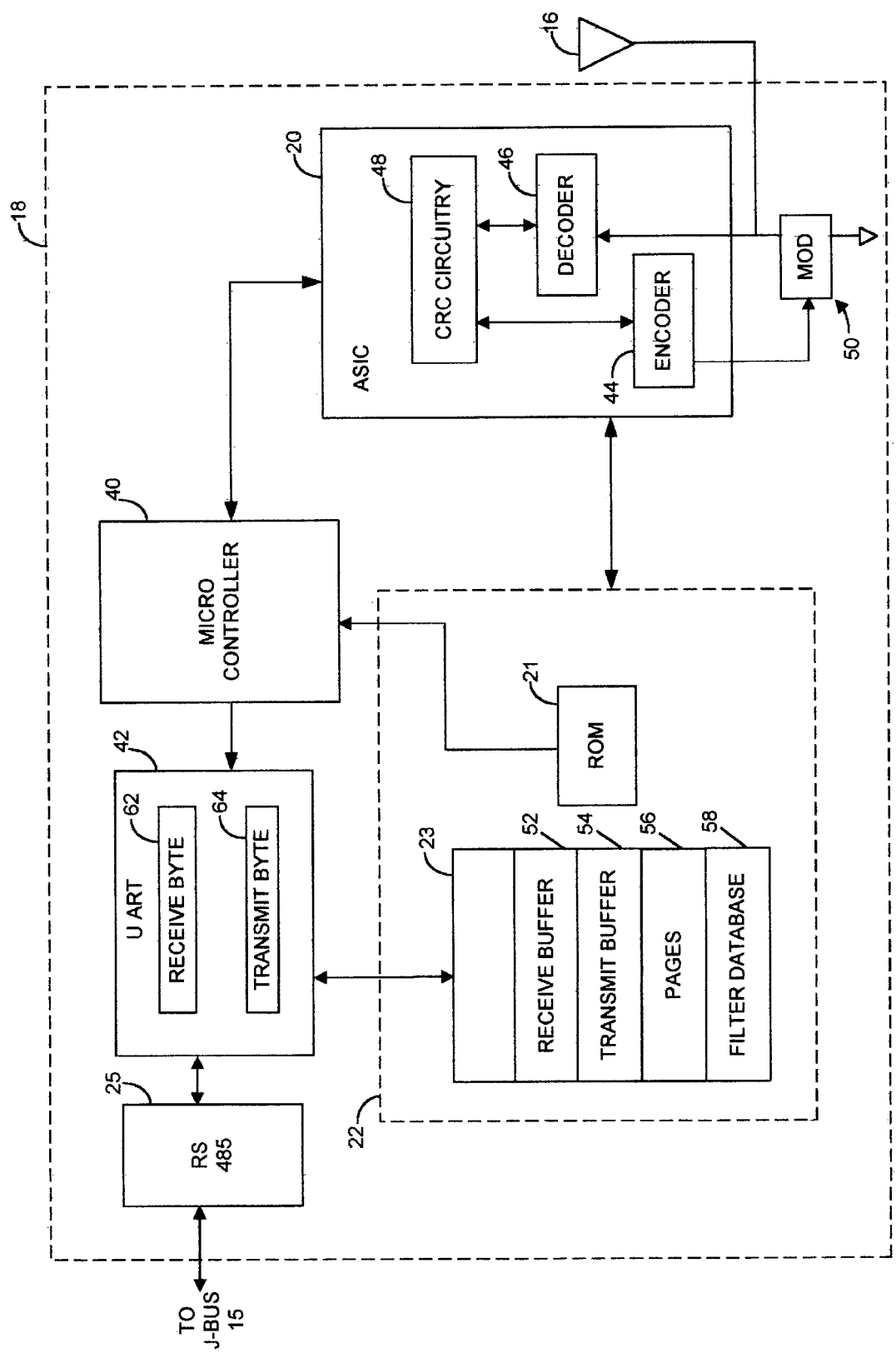
FIG. 2 is a schematic diagram of a electronic tag according to the present invention.

Referring to FIGS. 1 and 2, an electronic tag system 40 for remotely monitoring motor vehicle performance data includes a reader generally indicated at 14. Reader 14 includes a source 9 for generating interrogating radio frequency (RF) signals which are in turn coupled to a transceiver 10. The interrogating RF signals from source 9 may have a suitable frequency such as 915 MHZ. When source 9 is energized, transceiver 10 transmits the interrogating RF signal through antenna 12 to a suitable receiving antenna 16 (such as a di-pole antenna) at an electronic tag (transponder) 18.

Transponder 18 is associated with an object (motor vehicle 19) and is used to identify and retrieve data from that object. Transponder 18 includes encoding and decoding circuitry 20 and a data source 22. Data source 22 may include a read only memory (ROM) 21, which provides sequences of binary 1's and binary 0's in an individual pattern to identify parameters associated with the object. Data source 22 may include a page memory 23. Page memory 23 may be partitioned and include a receive buffer 52, a transmit buffer 54 and pages 56. Receive buffer 52 may be used to store messages received from the J-bus prior to final storage in pages 56. Transmit buffer 54 may be used to temporarily store messages received from host 30 for transfer to the J-bus. Page memory 23 may be used to store motor vehicle performance data retrieved through J-bus interface 25 and also motor vehicle data requests received from host 30.

Encoding and decoding circuitry 20 may be of the form of an application specific integrated circuit (ASIC) and includes an encoder 44, decoder 46 and CRC circuitry 48. Encoder 44 encodes data stored in data source 22 for transfer out to reader system 14. Decoder 46 decodes messages received from reader system 14. CRC circuitry 48 checks error correction codes received with incoming messages to insure the integrity of data transmissions from the reader system, and also generates error correction codes for transfer out with messages generated by the transponder for transfer to the reader system. In one embodiment, the ASIC includes a dual ported RAM. The dual ported RAM may operate in place of page memory 23 to store data for transfer to and from motor vehicle 19.

Information stored within data source 22 may be encoded by encoder 44 resulting in a plurality of signal cycles sequentially produced to represent the pattern of information stored in data source 22. The encoding may be of the form of a frequency shift keyed (FSK) code. A binary "1" in the sequence output by encoder 44 causes modulator 50 to produce a first plurality of signal cycles and a binary "0" causes the modulator to produce a second plurality of signal cycles different from the first plurality of signals. Such an encoding scheme is disclosed in U.S. Pat. No. 4,739,328 issued on Apr. 19, 1988 to Alfred R. Koelle and Jeremy A. Landt, assigned to the assignee of record of this invention, and which is expressly incorporated herein by reference. The pluralities of signal cycles, sequentially produced by the modulator to represent the pattern of binary 1's and binary 0's identifying the object, are introduced to the dipole antenna 16 for transmission to antenna 13 at reader 14. Modulator 50 may be a backscatter modulator. The backscatter modulator receives an interrogation signal generated by reader 14 and provides a modulated reflected signal back to the reader.

Antenna 13 introduces the received signals to transceiver 10 for processing by signal processor 24. Signal processor 24 produces signals in a sequence having a pattern identifying the pattern of the 1's and 0's in data source 22 at transponder 18. The sequence may then be transferred to a host 30.

The transfer of information from reader system 14 to host 30 may be accomplished by numerous methods as is known in the art. For example, reader system 14 may be integrated with host 30 and the information may be passed directly between the devices. Alternatively, host 30 may be remote and accordingly, the transfer of information may be accomplished by a modem. For example, reader system 14 may be a hand held device capable of providing an RF signal representative of the sequence data to the remote host. In this type of system, reader system 14 includes a second source (not shown) for generating an RF signal. The carrier signal from second source may have a suitable frequency, such as 2450 MHZ. The carrier signal may be modulated based on the sequence data and provided as a modulated carrier signal for transmission through an antenna 31 to a suitable antenna 32 at the host.

Transponder 18 includes micro controller 40 and interface circuitry 42. Micro controller 40 oversees the transfer of data within transponder 18 including the transfer of data between the J-bus via the J-bus interface 25 and the host 30. The micro controller may be a 68L11E9 micro controller provided by Motorola Inc. of Scottsdale, Ariz, and include a ROM and a uniform asynchronous receiver and transmitter (UART). Interface circuitry 42 provides a conversion of the data stored in page memory 23 to a format suitable for transfer onto the J-bus. Interface circuitry 42 may be a UART and included in micro controller 40. The UART includes a receive byte buffer 62 and transmit byte buffer 64. When in the receive mode, the UART transforms received serial data into a parallel format for storage in receive byte buffer 62. While in the transmit mode, the UART provides a serial data stream out to J-bus interface 25 of the data byte stored in the transmit byte buffer 64. The UART may operate in an interrupt mode, allowing for the transfer of data to and from the J-bus with minimal supervision of micro controller 40. An interrupt may be generated by the UART after each data byte is received on the receive side, while on the transmit side an interrupt may be issued each time the transfer of a byte of data from the transmit byte buffer has been completed.

J-bus interface 25 is a single channel device and operates to receive and transmit data onto the bus. J-bus interface 25 may provide data conversion for data transfers to and from the bus. The J-bus requires RS-485 signal levels. J-bus interface 25 may be a Part No. LTC485-IS8, produced by Linear Technology, Inc., of Milpitas, Calif. The Linear device converts from standard TTL signal levels to RS-485 signal levels on for the transmitted data and vice versa for received data.

Transponder Operation

Referring now to FIGS. 2 and 3a, at START-UP 300, transponder 18 is initialized. Initialization may include the running of an initialization routine stored in ROM 21 by micro controller 40. After initialization, the transponder enters the MONITOR state 304. While in the MONITOR state, transponder 18 monitors for transmissions received from reader systems (RF transmissions) and from the J-bus (bus transmissions). The transponder will transition to a CLEANUP state from the MONITOR state upon the expiration of a time-out or upon receipt of a command from the reader. The time-out may be user configurable to optimize performance in the transponder. In the CLEAN-UP state temporary variables may be re-initialized and configuration variables may be written to non-volatile memory.

Referring now to FIGS. 2, 3b and 3c, the monitor state includes two sub-functions an RF state machine 330 and a J-bus monitor state machine 350. The RF state machine details the operations for receiving messages from a reader system. The J-bus Monitor state machine details the operations for receiving messages from the J-bus.

The RF state machine 330 initializes at WAIT state 332. When a RF message is received, the decoder 46 decodes the message and determines if the command portion of the message indicates a read or a write operation. If the operation indicated is a read operation, the transponder transitions to a SEND DATA state 334. During the SEND DATA state, the transponder retrieves the appropriate data from transponder memory (data source 22) as indicated by the received RF message, and transfers the data back to the reader via modulator 50. Thereafter, the transponder transitions back to WAIT state 332.

If the message decoded is a write operation, then the transponder transitions to the TRANSFER state 336. The TRANSFER state may include transfer of data received as part of the message to the J-bus. The details of data transfer to the J-bus are discussed in greater detail below. Alternatively, the transfer may entail only the transfer of data to transponder memory. After data has been written, the transponder transitions to the ACKNOWLEDGE state, and provides an acknowledgment signal back to the reader upon completion of the write operation. Thereafter, the transponder transitions back to WAIT state 332 for the next RF message.

The J-bus monitor state machine 350 initializes at WAIT state 352. When a byte of data is received, the transponder transitions to the BUFFER state 354. BUFFER state 354 provides a temporary buffering of data bytes from the J-bus prior to storage in transponder memory. The transponder transitions back to WAIT state 352 as each byte of a message is received from the J-bus until the entire message has been received. Thereafter, the transponder may transition to FILTER state 356. FILTER state 356 may be used to filter the data received from the J-bus. Specifically, the messages from the J-bus are formatted to include a Device ID, sub-system ID and parameter ID. The device ID identifies the particular device that sourced the information included in the message. The sub-system Id is a further identifier within the particular device as to which particular sub-system provided the data. The parameter ID identifies the particular format and type of data provided. FILTER state 356 performs a comparison between the various ID's associated with a received message and a filter database 58 stored in memory. The filter database may be provided or modified by the host to allow for the screening of information retrieved. The filtering operation will be described in further detail below. Assuming the message retrieved is not to be filtered, the transponder transitions to the TRANSFER state 358 and stores the message in page memory. Alternatively, the message may be purged from the buffer and the transponder may transition back to WAIT state 352.

The J-bus monitor state machine may include an initialization state (not shown). The transition from the initialization state to the WAIT state may be triggered by the writing of a request onto the J-bus. The WAIT state may include a time-out that provides for a transition back to the initialization state. The triggering of the WAIT state provides a initial screening for data to be extracted from the J-bus. The time-out function determines the amount of time messages are extracted from the J-bus. In an alternative embodiment, the J-bus monitor state may include further filtering up to and including filtering of all responses not particularly requested by the tag.

Operation

Antenna 16 receives a modulated interrogation signal and provides it as an input to decoder 46. Decoder 46 derives messages from data received from reader system 14. The messages may be formatted into a frame and include a header, command, data and an error correction code. The header may be used to lock onto the message pattern. The command portion of a frame instructs the micro controller within the transponder as to the type of operation requested by the reader (or host). Examples of commands include read and write commands. The data portion of the frame may include a page location(s) identifying a portion of page memory to be read or written, and may include other data including data to be written to the J-bus. After receipt of a message, CRC circuitry 48 determines if the received message includes any errors based on an evaluation of all of the data received including the error correction code. If no errors are detected, then micro controller 40 operates on the message.

Read Operation

If the command received indicates a read operation, then micro controller 40 oversees the transfer of the appropriate of the message data to encoder 44. Encoder 44 outputs a sequence of signal cycles indicative of the data provided along with an error correction code. The error correction code is generated by the error correction circuitry based on the data received by encoder 44 which is to be transferred to the host.

Data source 22 includes page memory 23. As was described above, page memory 23 includes a receive buffer 52, transmit buffer 54 and pages 56. The pages may be configured as a ring buffer allowing for the over-writing of old messages as required. Pages 56 may be sized to be 12 pages which corresponds to the storage of six J-bus responses. J-bus response data indicative of the motor vehicle operating conditions may be read directly from pages 56. The J-bus response retrieval process is described in greater detail below.

Write Operation

If the command received indicates a write operation, then the micro controller oversees the writing of the decoded data to the particular location in page memory 23. The write operation may be directed to RAM. Write operations to RAM include write operations for messages (or requests) to be transferred to the J-bus.

As indicated above, page memory 23 may be partitioned to include a transmit buffer 54. The transmit buffer 54 is used to store messages to be transferred to the J-bus. Write operations directed to the transmit buffer result in the initiation of a further transfer sequence in which the data is transferred to the J-bus.

Micro controller 40 monitors the status of transmit buffer 54 and upon receipt of a message for transfer to the J-bus initiates the transfer of the message to interface circuitry 42. The transfer of requests to interface circuitry 42 may be performed a byte at a time, with a new byte transferred from the transmit buffer 54 to a transmit byte 64 in interface circuitry 42 upon receipt of an interrupt from the interface circuitry 42 indicating the successful transfer of the last byte to the J-bus. Alternatively, the transfer of requests may be by polled I/O. Interface circuitry 42 transfers the byte data in serial stream to J-bus interface 25, which in turn transfers the requests to the J-bus.

J-bus Responses

J-bus interface 25 monitors the J-bus for transmissions and provides a serial stream of J-bus traffic to interface circuitry 42. Interface circuitry 42 transforms the serial stream into parallel data using the receive byte buffer 62. When an entire byte has been received, interface circuitry 42 generates an interrupt for servicing by micro controller 40. The micro controller oversees the transfer of the data bytes into the receive buffer. Messages received from the J-bus are formatted and include a device ID, sub-system ID, parameter ID and message length. After an entire message has been received and stored in the receive buffer 52, the micro controller may invoke a filter routine to determine if the message should be transferred to another portion of RAM for storage and ultimate transfer to the host or if the message should be discarded.

The filter routine operates on filter data stored in filter database 58 in page memory 23 which includes a screening parameter for messages to be retrieved. The screening parameter may indicate device ID's, sub-system ID's, parameter ID's or combinations of the three that are requested by the host. Alternatively, the screening parameter my indicate device ID's and the like that are not to be passed on and should be discarded. The filter routine compares the screening parameter data with the appropriate data portion of the received message. The screening determination results in the purging of the receive buffer, either through the transfer of data to a new location in RAM (to pages 56) or the discarding of data messages.

The present invention provides an RF interface from a ground-based installation to a motor vehicle's on-board computer system. A tag is configured with interface circuitry including a connection to J1708 bus on the motor vehicle. In operation the tag operates as a packet modem in that once communications are established between a reader and the tag, message exchange occurs between the ground-based fleet management system and components physically connected to the J1708 bus. The tag places messages on the J-bus based on messages received from the reader. The tag also extracts messages from the J-bus and places them in a page memory to be read by a reader. Buffering of bus messages occurs in the page memory.

The present invention includes a filtering mechanism implemented in the tag. The filtering mechanism filters messages in the direction traveled from the bus to the reader. The filter may be implemented in the UART to screen messages prior to transfer to page memory. A filter data base may be accessed by the UART to screen responses. The data base may include a plurality of filter entries, each entry including a screening parameter. In one embodiment, the screening parameter may consist of four bytes including a control byte, and three bytes of message identifier (MID). In this embodiment, a comparison is made between the first three bytes of the J-bus message and the three bytes of MID data. The first three bytes of a J-bus message identifies the source of the particular message.

In one embodiment, eight different filters are implemented. Each filter (or channel) may be active at the same time. The control byte may be used to enable and disable the particular filter channel. The filters allow for screening of the responses received to determine whether or not the message should be passed on to the host or discarded.

Figure 4:
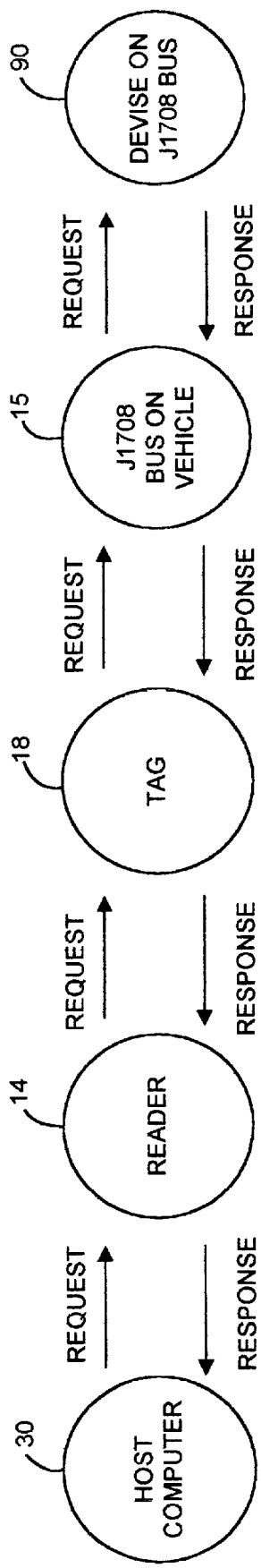
FIG. 4 shows message flow between a host and a device coupled on the J-bus according to the present invention.

Referring now to FIG. 4 message flow for communications between the host, reader and a transponder is shown. Host 30 initiates communication by providing a request to reader 14. Reader 14 provides a message to transponder 18 indicating a write operation to the particular portion of the transponder memory associated with J-bus requests. The data portion of the message includes the request from host 30. Transponder 18 decodes the message and writes the request to memory.

Thereafter, transponder 18 transfers the request to the J-bus 15. A device 90 indicated by the request from the host provides a response to the request to J-bus 15. Transponder 18 monitors the J-bus and retrieves the response. As was described above, all responses on the J-bus may be retrieved and only certain ones of the responses may be stored in RAM for transfer back to the host by transponder 18.

Transponder 18 stores the response in memory. At a later time, transponder 18 receives a read command from reader 14 indicating the portion of memory dedicated to storage of J-bus responses. The read operation results in the transmission back to the reader 14 of the J-bus response. Finally, the response may be transferred to host 30 by reader 14 completing the transfer cycle.

The present invention as been described in terms of a preferred embodiment. The invention, however, is not limited to the embodiment depicted and described. Rather the scope of the invention is defined by the claims which follow.

What is claimed is:

1. An apparatus for communicating directly between a host computer system and a motor vehicle on board computer system, the on board computer system having a bus coupling and for communicating with a plurality of motor vehicle systems, the apparatus comprising:

an electronic tag coupled to the bus including
- a transceiver for transmitting data to and receiving requests from the host computer system;
- a memory for storing requests and response data;
- a decoder for decoding requests from the host computer system;
- a bus interface coupling the electronic tag to the bus and operable to read data from and write data to the bus, the bus interface extracting response data from the bus responsive to requests received from the host computer system, the response data being stored in the memory; and
- a controller responsive to write requests from the host computer system to transfer data to the bus interface for writing out onto the bus and responsive to read requests from the host to transfer data stored in memory back to the host computer system.

2. The apparatus of claim 1 wherein the electronic tag further includes a filter, the filter filtering responses received from the bus and enabling the storage in memory only of a predetermined subset of the responses.

3. The apparatus of claim 2 wherein the filter monitors requests and stores in memory only data seen on the bus corresponding to the requests transmitted from the host.

4. The apparatus of claim 1 wherein the controller enables storage of responses from the bus upon writing data to the bus.

5. The apparatus of claim 1 wherein the electronic tag further includes
- an antenna for receiving host requests and transmitting data back to the host computer system;
- an encoder for encoding data to be transmitted to the host computer system; and
- a backscatter modulator for receiving an interrogating signal from a host computer system reader including encoded requests and modulating the interrogating signal with encoded data received from the encoder.

6. The apparatus of claim 1 wherein the bus is a J1708 bus.

7. The apparatus of claim 1 wherein the motor vehicle is a truck.

8. The apparatus of claim 1 wherein the bus interface includes an RS-485 transceiver.

9. The apparatus of claim 1 wherein the memory includes a receive buffer and a transmit buffer, the receive buffer temporarily storing responses from the bus prior to transfer in memory and the transmit buffer for buffering bus requests prior to transfer to the bus.

10. An apparatus for remotely monitoring by a host computer system the performance of a motor vehicle, the motor vehicle including an on board computer system having a bus for communicating with a plurality of motor vehicle systems, the apparatus comprising:
- an electronic tag coupled to the bus including
  - a transceiver for transmitting data to and receiving requests from the host;
  - a memory for storing requests and response data;
  - a decoder for decoding requests from the host computer system, the requests including a request command and request data, the request command indicating one of a read and write operation, the request data including one of location data in memory associated with the request command and a bus request;
  - a bus interface coupling the electronic tag to the bus and for reading data from and writing data to the bus, the bus interface extracting responses from the bus responsive to requests from the host computer system, the responses being stored in the memory; and
  - a controller operable to respond to write requests to the bus by transferring a bus request to the bus interface and responsive to read requests from the host by transferring data indicated by the location data back to the host computing system.

11. A system for remotely monitoring motor vehicle performance by a host computer system comprising:
- a system bus resident on the motor vehicle for communicating with a plurality of motor vehicle systems;
- a remote reader external from the motor vehicle and for generating host computer system requests for extracting data from one or more motor vehicle systems;
- an electronic tag coupled to the system bus including
  - a transceiver for transmitting data to and receiving requests from the remote reader;
  - a memory for storing requests and response data;
  - a decoder for decoding requests from the remote reader;
  - a bus interface for reading data from and writing data to the system bus, the bus interface extracting responses from the system bus responsive to requests from the remote reader, the responses being stored in the memory; and
  - a controller responsive to write requests from the remote reader to transfer data to the bus interface and responsive to read requests from the remote reader to transfer data stored in memory back to the remote reader.

12. The apparatus of claim 11 wherein the electronic tag further includes a filter, the filter filtering responses received from the bus and enabling the storage in memory only of a predetermined subset of the responses.

13. The apparatus of claim 12 wherein the filter monitors requests and stores in memory only data corresponding to the requests transmitted from the remote reader.

14. The apparatus of claim 11 wherein the controller enables storage of responses from the bus upon writing data to the bus.

15. The apparatus of claim 11 wherein the electronic tag further includes
- an antenna for receiving host requests and transmitting data back to the remote reader;
- an encoder for encoding data to be transmitted to the remote reader; and
- a backscatter modulator for receiving an interrogating signal from the remote reader including encoded requests and modulating the interrogating signal with encoded data received from the encoder.

16. The apparatus of claim 11 wherein the bus is a J1708 bus.

17. The apparatus of claim 11 wherein the motor vehicle is a truck.

18. A system for remotely monitoring motor vehicle performance comprising:
- a system bus resident on the motor vehicle for communicating with a plurality of motor vehicle systems;
- a remote reader external from the motor vehicle for generating host requests for extracting data from one or more motor vehicle systems;
- an electronic tag coupled to the system bus including a memory for storing bus requests and bus response data, a bus interface for reading data from and writing data to the system bus and a controller responsive to write requests from the remote reader to transfer data to the bus interface and responsive to read requests from the remote reader to transfer data stored in memory back to the remote reader.

* * * * *